United States Patent
Chan et al.

(10) Patent No.: US 10,909,778 B1
(45) Date of Patent: *Feb. 2, 2021

(54) SYSTEMS AND METHODS FOR PROVIDING VEHICULAR COLLISION DATA

(71) Applicant: STATE FARM MUTUAL AUTOMOBILE INSURANCE COMPANY, Bloomington, IL (US)

(72) Inventors: Aaron Scott Chan, Bloomington, IL (US); Kenneth J. Sanchez, San Francisco, CA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,342

(22) Filed: Aug. 19, 2019

Related U.S. Application Data (63) Continuation of application No. 15/873,374, filed on Jan. 17, 2018, now Pat. No. 10,388,084.

(Continued)

(51) Int. Cl.
*G01C 21/34* (2006.01)
*G07C 5/00* (2006.01)
(Continued)

(52) U.S. Cl.
CPC ......... *G07C 5/008* (2013.01); *G06K 9/00791* (2013.01); *G07C 5/08* (2013.01); *H04W 4/44* (2018.02); *B60W 2554/00* (2020.02)

(58) Field of Classification Search
CPC ........ G07C 5/008; G07C 5/08; G07C 5/0808; H04W 4/44; G06K 9/00791;
(Continued)

(56) References Cited

U.S. PATENT DOCUMENTS 9,390,625 B2 * 7/2016 Green .................... G07C 5/008
9,581,461 B1 * 2/2017 Chintakindi ............ H04W 4/44
(Continued)

FOREIGN PATENT DOCUMENTS

EP 3251897 A1 * 12/2017 ............. B60Q 1/525

*Primary Examiner* — An T Nguyen
(74) *Attorney, Agent, or Firm* — Marshall, Gerstein & Borun LLP (57) ABSTRACT

A computer-implemented method is provided for providing a notification that includes a traverse classification. The method includes determining, at a computing system including one or more processors, a contact region based on information indicative of a location of vehicle contact and a location of a person associated with the vehicle contact. The method also includes performing, by the one or more processors, an assessment of one or more aspects of one or more routes associated with the contact region and the contact region. The method also includes based on the assessment, determining, by the one or more processors, one or more traverse classifications corresponding to the one or more routes associated with the contact region. The method also includes providing, by the computing system, a notification that includes a traverse classification of the one or more traverse classifications to one or more vehicle operators approaching the contact region.

18 Claims, 6 Drawing Sheets

Related U.S. Application Data (60) Provisional application No. 62/448,224, filed on Jan. 19, 2017.

(51) Int. Cl.
  *G06K 9/00* (2006.01)
  *H04W 4/44* (2018.01)
  *G07C 5/08* (2006.01)

(58) Field of Classification Search
  CPC .......... B60W 2550/10; B60W 30/0956; G01C 21/3415; G01C 21/36; G01S 19/42; G06Q 50/265; H04L 43/16; G06N 5/04
  See application file for complete search history.

(56) References Cited

U.S. PATENT DOCUMENTS

| | | | | |
|---|---|---|---|---|
| 9,841,767 | B1* | 12/2017 | Hayward | G05D 1/0285 |
| 9,934,625 | B1* | 4/2018 | Wahba | B60R 21/00 |
| 10,048,700 | B1* | 8/2018 | Curlander | G08G 1/164 |
| 10,388,084 | B1* | 8/2019 | Chan | G07C 5/0808 |
| 2014/0297172 | A1* | 10/2014 | Huelsen | G01S 13/931 |
| | | | | 701/301 |
| 2014/0333425 | A1* | 11/2014 | Giraud | G07C 5/008 |
| | | | | 340/438 |
| 2015/0127570 | A1* | 5/2015 | Doughty | G06Q 50/265 |
| | | | | 705/325 |
| 2016/0059855 | A1* | 3/2016 | Rebhan | B60W 30/08 |
| | | | | 701/41 |
| 2016/0061625 | A1* | 3/2016 | Wang | G01C 21/3697 |
| | | | | 701/454 |
| 2016/0093212 | A1* | 3/2016 | Barfield, Jr. | H04N 7/185 |
| | | | | 348/144 |
| 2016/0109250 | A1* | 4/2016 | Baughman | G01C 21/3415 |
| | | | | 701/515 |
| 2016/0185345 | A1* | 6/2016 | Sasabuchi | B60W 30/08 |
| | | | | 701/301 |
| 2016/0332589 | A1* | 11/2016 | Van Wiemeersch | |
| | | | | B60R 21/01512 |
| 2016/0335596 | A1* | 11/2016 | Richie | G06Q 10/10 |
| 2017/0053461 | A1* | 2/2017 | Pal | G07C 5/008 |
| 2017/0084177 | A1* | 3/2017 | Matsuoka | B60W 30/09 |
| 2017/0166204 | A1* | 6/2017 | Yoo | B60W 30/09 |
| 2017/0191847 | A1* | 7/2017 | Chintakindi | H04W 4/44 |
| 2017/0268896 | A1* | 9/2017 | Bai | G01C 21/36 |
| 2017/0276495 | A1* | 9/2017 | Krishnan | G01C 21/3415 |
| 2017/0292848 | A1* | 10/2017 | Nepomuceno | G01C 21/3492 |
| 2018/0005523 | A1* | 1/2018 | Cahan | G08G 1/087 |
| 2018/0053424 | A1* | 2/2018 | Rajendran | G06K 9/00791 |
| 2018/0061151 | A1* | 3/2018 | Chainer | G07C 5/0841 |
| 2018/0101923 | A1* | 4/2018 | Griesmann | G06N 5/04 |
| 2018/0144260 | A1* | 5/2018 | Santos-Gomez | G01C 21/32 |
| 2018/0299284 | A1* | 10/2018 | Wang | G08G 1/0141 |
| 2019/0094034 | A1* | 3/2019 | Aist | G01C 21/3415 |

* cited by examiner

SYSTEMS AND METHODS FOR PROVIDING VEHICULAR COLLISION DATA

CROSS-REFERENCE TO RELATED APPLICATION

This application is a continuation of and claims priority to U.S. application Ser. No. 15/873,374, entitled "SYSTEMS AND METHODS FOR PROVIDING VEHICULAR COLLISION DATA," filed on Jan. 17, 2018, which claims priority to and the benefit of U.S. Provisional Patent Application No. 62/448,224, entitled "Systems And Methods For Providing Vehicular Collision Data," filed on Jan. 19, 2017. The disclosure of each of the foregoing applications is hereby incorporated herein by reference.

FIELD

The present disclosure is directed to determining one or more traverse classifications associated with vehicle collisions. More particularly, the present disclosure is directed to systems and methods for notifying vehicle operators of an upcoming collision site involving vehicle ejection.

BACKGROUND

Today, vehicle collisions may be identified by drivers, passengers, and witnesses who see or are involved in the collision. However, such collisions may not be identified and reported in real-time, because the drivers, passengers, and witnesses involved in the collision may be incapacitated or unwilling to report the collision. Moreover, an assessment of vehicle ejection may not be known until one or more emergency responders arrive at the scene of the collision.

SUMMARY

In one aspect, a computer-implemented method is disclosed. The method includes determining, at a computing system including one or more processors, a geographic area including a location of vehicle contact and a location of a person associated with the vehicle contact. The method also includes determining, by the one or more processors, for each lane of one or more lanes of a route, whether the lane overlaps the geographic area. The method also includes providing, by the computing system, a notification including one or more navigation instructions to respective mobile computing devices of one or more vehicle operators approaching the geographic area, the one or more navigation instructions based upon the determination of whether each lane of the one or more lanes overlaps the geographic area.

In another aspect, a system for providing a notification that includes a traverse classification is disclosed. The system includes one or more processors. The system also includes a non-transitory computer-readable memory coupled to the one or more computing devices and storing thereon instructions, that when executed by the one or more computing devices, cause the one or more computing devices to determine a geographic area including a location of vehicle contact and a location of a person associated with the vehicle contact. The instructions also cause the one or more computing devices to determine, for each lane of one or more lanes of a route, whether the lane overlaps the geographic area. The instructions also cause the one or more computing devices to provide, to respective mobile computing devices of one or more vehicle operators approaching the geographic area, a notification including one or more navigation instructions, the one or more navigation instructions based upon the determination of whether each lane of the one or more lanes overlaps the geographic area.

In yet another aspect, one or more non-transitory computer-readable media are disclosed. The one or more non-transitory computer-readable media may store computer-executable instructions that, when executed via one or more processors, cause a computer to determine a geographic area including a location of vehicle contact and a location of a person associated with the vehicle contact. The instructions also cause the computer to determine, for each lane of one or more lanes of a route, whether the lane overlaps the geographic area. The instructions also cause the computer to provide, to respective mobile computing devices of one or more vehicle operators approaching the geographic area, a notification including one or more navigation instructions, the one or more navigation instructions based upon the determination of whether each lane of the one or more lanes overlaps the geographic area.

DETAILED DESCRIPTION

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

The present embodiments may relate to, inter alia, receiving, comparing, and analyzing vehicle data, vehicle occupant data, and route data. Existing vehicle operation environments support the generation of various vehicle data upon a collision. However, there is no way to notify vehicle operators heading towards a contact region (i.e., a collision site) of the risks associated with traversing along a direction of one or more routes that lead to the contact region. The contact region may include a collision between the vehicle and other vehicle(s) that may result in ejection of a person from the vehicle. The contact region may also include a collision between the vehicle and one or more objects (e.g., a guard rail, buildings, trees, etc.) that also may result in ejection of a person. The present embodiments improve these shortcomings by analyzing the vehicle data, the vehicle occupant data, and the route data for subsequent transmission of the analysis to one or more vehicle operators travelling towards the contact region.

In order to determine a traverse classification for a route associated with a contact region, a system may be configured to automatically receive location data from a vehicle involved in a collision and location data from a person ejected from the vehicle. For example, the location data from the person may be transmitted by a mobile device (e.g., a cellular telephone) associated with the person. For instance, the mobile device may be configured to transmit GPS data to the system and/or vehicle upon detection of an ejection event.

Based on the location data of the vehicle and the person, the system may determine a contact region. In one example, the contact region may be designated as the region between the vehicle and the person. By way of example, the system may determine the contact region as a circular region with a diameter based on the distance between the location of the vehicle and the location of the person. In some embodiments, the system may determine the contact region using other constraints. For example, they system may determine a speed and a direction of the vehicle involved in the collision according to GPS data of the vehicle. Based on the speed and the direction, the system may determine one or more likely trajectories of the person ejected from the vehicle. In this example, the system may be configured to determine the contact region according to the one or more likely determined trajectories of the person.

In addition to receiving the location data of the vehicle and person, the system may be configured to receive route data pertaining to one or more routes associated with the contact region. For example, the route data may include one or more aspects based on the geometric design of the one or more routes. In one example, the system may receive route data that includes the number of lanes, the presence of traffic barriers, the speed limit associated with the routes, etc.

The system may perform an assessment of the route data and the contact region. In one example, the assessment may include an analysis of the geographic area corresponding to the contact region and one or more lanes of the routes. In this example, the system may determine the amount of overlap between the geographic area and the one or more lanes. In another example, the assessment may include a determination of whether the contact region is contained by the presence of one or more traffic barriers (e.g., guardrails, etc.).

Based on the results of the assessment, the system may determine one or more traverse classifications associated with the one or more lanes leading to the contact region. The one or more traverse classifications may be associated with one or more levels of safety. For example, a traverse classification of "High Risk" may be assigned to lanes along a direction that intersect with the contact region. In this example, a vehicle operator may be at a higher risk of traveling along a given lane in a direction that leads to the location of a person ejected from a vehicle. In another example, the system may determine a "Low Risk" to vehicle operators traveling in a multilane highway along lanes in a direction of travel that do not intersect with the contact region.

Further, the system may be configured to provide a notification that includes a traverse classification to one or more vehicle operators approaching the contact region. In one example, the system may receive information about a heading of one or more vehicle operators. Based on the heading, the system may provide a notification that includes a given traverse classification. In the example described above in regard to the multilane highway, vehicle operators associated with a heading along the direction that intersects with the contact region may receive a given traverse classification of "High Risk," while vehicle operators associated with a heading along the opposite direction of travel that does not intersect with the contact region may receive a traverse classification of "Low Risk." In some embodiments, the system may also provide one or more navigation options for rerouting around the contact region to the vehicle operators. In some scenarios, the system may reduce the occurrence of additional collisions by providing vehicle operators with ways of rerouting around the contact region. In other scenarios, the system may also reduce the occurrence of additional collisions by providing a notification of the risk associated with traveling towards to the contact region and thereby causing a vehicle operator to reduce a speed of travel and/or change lanes.

Figure 1:
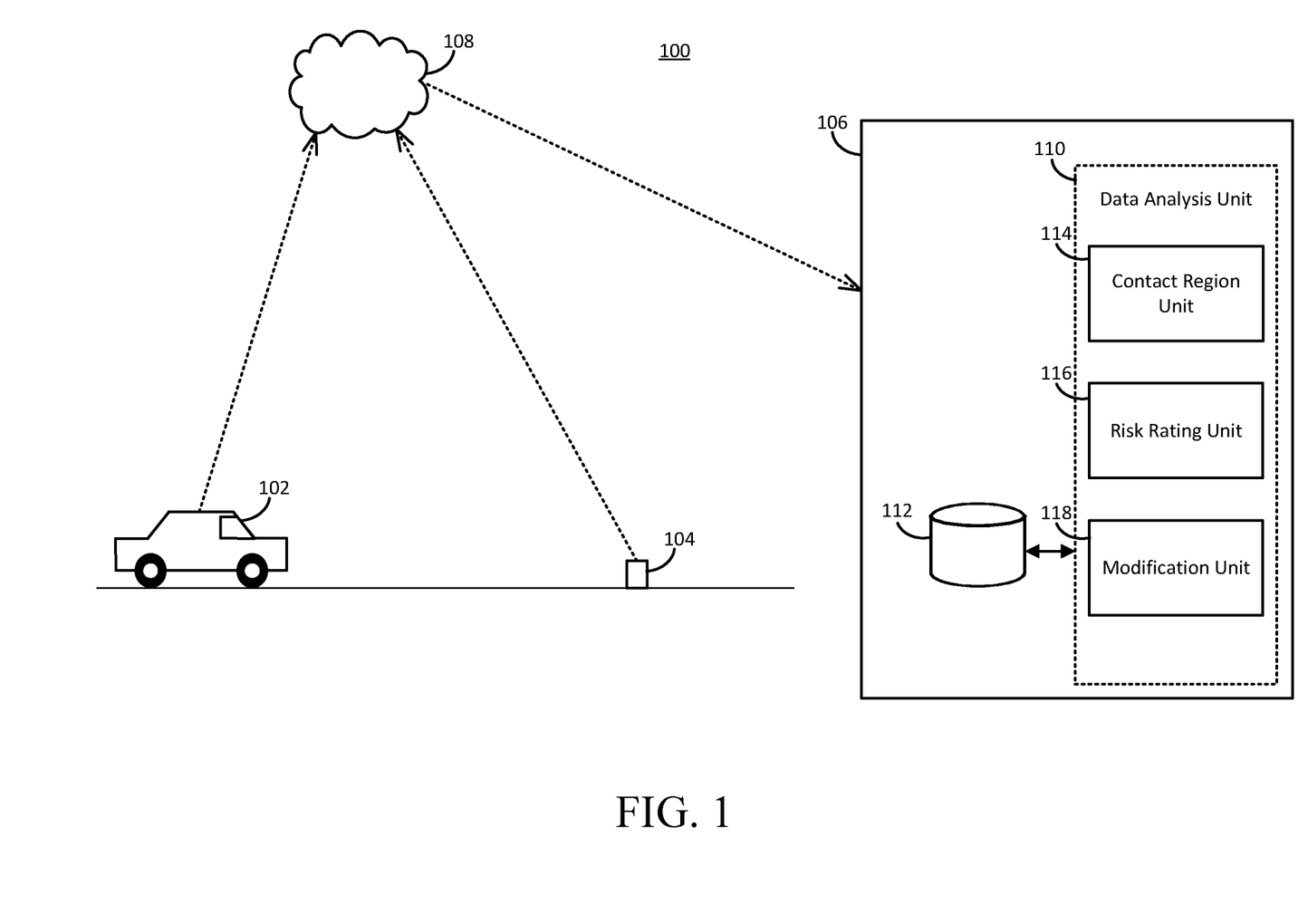
FIG. 1 is a diagram of an example system for providing a notification that includes a traverse classification, according to an embodiment of the present disclosure.

Referring now to the figures, FIG. 1 is a diagram of an example system 100 for processing data obtained from a vehicle 102 and a mobile device 104 and further providing route guidance (e.g., navigational information) to one or more vehicle operators. While FIG. 1 depicts vehicle 102 as an automobile, vehicle 102 may instead be a truck, motorcycle, or any other type of land-based vehicle capable of carrying at least one human passenger (including the driver). Vehicle 102 is in communication with a remote server 106 via a network 108. The network 108 may be a single network, or may include multiple networks of one or more types (e.g., a cellular telephone network, a wireless local area network (WLAN), the Internet, etc.).

The vehicle 102 may include an onboard system (not shown in FIG. 1), which may comprise various different subsystems arranged within and/or on the exterior of vehicle 102. The onboard system of vehicle 102 may include subsystems that monitor and/or control various operational parameters of vehicle 102. For example, an engine electronics subsystem may generate data indicative of how the engine of vehicle 102 is monitored and controlled, a transmission electronics subsystem may generate data indicative of how the shifting of the gears of vehicle 102 is monitored and controlled, a chassis electronics subsystem may generate data indicative of how various subsystems of the vehicle 102 are monitored and controlled, a safety electronics subsystem may generate data pertaining to active and passive safety of vehicle 102, and a vehicle navigation system may generate data indicative of location information (e.g., GPS data) of vehicle 102.

In some embodiments, the onboard system may include fewer subsystems and/or the onboard system may include additional devices or subsystems. Moreover, one or more subsystems in the onboard system may be included in a general purpose computing device such as a smartphone. For example, the vehicle navigation system may include a software application running on a smartphone that includes the appropriate hardware (e.g., an antenna and receiver).

The onboard system may also include a data collection unit (not shown in FIG. 1) that receives data and/or analog signals from various subsystems. The data collection unit may collect the data and/or analog signals substantially in real time, and in any of various different ways, according to different embodiments. In some embodiments, for example, the data collection unit may periodically sample data and/or analog signals from the various subsystems, or is notified by the respective sensors or subsystems when new data is available, etc. In some embodiments, the data collection unit may receive data from subsystems and/or mobile device(s) via a wireless link, such as a Bluetooth link.

The data collection unit may be coupled to an interface which transmits the data received from data collection unit to the remote server 106 via the network 108. The interface may include a transmitter and one or more antennas, for example. In one embodiment, the interface may be included in a general purpose computing device such as a smartphone. For example, the data collection unit may be coupled to the interface via a Bluetooth link to a smartphone device.

The remote server 106 is an electronic processing system capable of performing various functions, and includes an interface configured to receive data from vehicle 102 and mobile device 104 via network 108. The interface of the remote server 106 may be similar to the interface of the vehicle 102, for example. As shown in FIG. 1, the remote server 106 includes a data analysis unit 110 and a route database 112. The data analysis unit 110 may include one or more processors, and is configured to process the data received from vehicle 102 and mobile device 104 for various purposes according to different embodiments, as discussed further below.

In the example system 100 of FIG. 1, the data analysis unit 110 includes a contact region unit 114, a risk rating unit 116, and a navigation modification unit 118. In other embodiments, the data analysis unit 110 does not include one or more of units 114, 116, and 118 and/or includes additional processing units not shown in FIG. 1. In one embodiment, each of units 114, 116, and 118 includes a set of instructions stored on a tangible, non-transitory computer-readable medium and capable of being executed by the processor(s) of data analysis unit 110 to perform the functions described below. In another embodiment, each of units 114, 116, and 118 includes a set of one or more processors configured to execute instructions stored on a tangible, non-transitory computer-readable medium to perform the functions described below. In an embodiment, data analysis unit 110 includes a memory (not shown in FIG. 1) for storing outputs of the analysis performed by data analysis unit 110.

The route database 112 can be accessed by the contact region unit 114, and/or other units within data analysis unit 110. In one embodiment, the route database 112 may store information pertaining to one or more routes (e.g., roads, highways, freeways, routes of travel, etc.). For example, the information pertaining to a road may include various aspects of the road such as the number of lanes associated with the road, elevation change(s) of the road, a speed limit associated with the road, etc. The route database 112 may be configured to receive updated information pertaining to routes based on one or more schedules.

In some embodiments, the contact region unit 114 is configured to analyze the collision site based on the location data from vehicle 102, the location data from mobile device 104, and data from route database 112. For example, the contact region unit 114 may be configured to retrieve from route database 112 route information associated with the location of vehicle 102 and the location of mobile device 104 in order to perform an assessment on one or more directions of travel. In one instance, the assessment may include the number of lanes affected by the collision site and whether or not an elevation change is associated with the collision site. In this instance, if the elevation change exceeds a threshold (e.g., 40 feet in height based on a distance of 100 feet), then one or more vehicle operators could be at a higher risk by travelling along a road with a certain grade that leads to the collision site.

Based on the retrieved information from the route database 112, the contact region unit 114 may perform an assessment based on one or more aspects associated with the collision site. In one example, the contact region unit 114 may retrieve the number of lanes pertaining to the location of the vehicle 102 and the location of the mobile device 104 from route database 112. In this example, the contact region unit 114 may determine which lanes are affected (e.g., impassable due to the collision) based on image analysis of the collision site and a portion of the route affected by the collision site. In another example, the contact region unit 114 may analyze the radius of curvature associated with the route to determine a level of safety for vehicle operators that may be approaching the collision site.

The risk rating unit 116 may be configured to receive the assessment from the contact region unit 114 and determine one or more traverse classifications associated with the collision site. In one example, the risk rating unit 116 may be configured to determine the traverse classification by running one or more algorithms. For instance, one algorithm may provide a traverse classification of "Low Risk" based on the assessment by contact region unit 114 indicating that the collision site does not affect any lanes of a route. In another example, the algorithm may determine a traverse classification of "High Risk" based on the collision site affecting all lanes of the route.

In some embodiments, the risk rating unit 116 may provide a traverse classification that includes a score. For example, each level of a traverse classification may correspond to a threshold score range, such a score above 90 corresponding to a "High Risk," a score between 30 and 90 corresponding to "Medium Risk," and a score below 30 corresponding to a "Low Risk." The risk rating unit 116 may be configured to determine a level of risk by aggregating and/or combining one or more aspects (e.g., distance between vehicle 102 and mobile device 104, incline of the route, etc.) pertaining to the collision site. In one example, the risk rating unit 116 may apply weights to the one or more aspects (e.g., number of lanes unaffected by the collision site, etc.) to determine the traverse classification. In another example, the risk rating unit 116 may be configured to receive instruction(s) from the one or more units of the data analysis unit 110 in order to determine the traverse classification. The risk rating unit 116 may be configured to provide the traverse classification to the navigation modification unit 118.

Based on the traverse classification, the navigation modification unit 118 may determine one or more ways to reroute a vehicle operator that is heading towards the collision site. In one scenario, the navigation modification unit 118 may recommend a lane change based on a traverse classification of "Low Risk." For instance, if the collision site is located near the shoulder of a road but does not overlap with any lanes, then the vehicle operator may be instructed to change lanes in order to provide an open lane for emergency responders attempting to reach the collision site. In another scenario involving a collision site on a highway, the navigation modification unit 118 may recommend avoiding the collision site altogether based on a traverse classification of "High Risk." In this scenario, the navigation modification unit 118 may also determine one or more exits off the highway that could be provided as options to vehicles operators in order to reroute around the collision site. In another example, the navigation modification unit 118 may determine a location to stop temporarily if the collision site is unavoidable based on a lack of alternative routes. For instance, if the collision site is located on a bridge, then there may not be an alternative for traveling to a given location that requires the use of the bridge. In this instance, the remote server 106 may provide one or more locations (e.g., rest area, nearby restaurants, etc.) to a vehicle operator in order to avoid use of the bridge according to the traverse classification.

Figure 2:
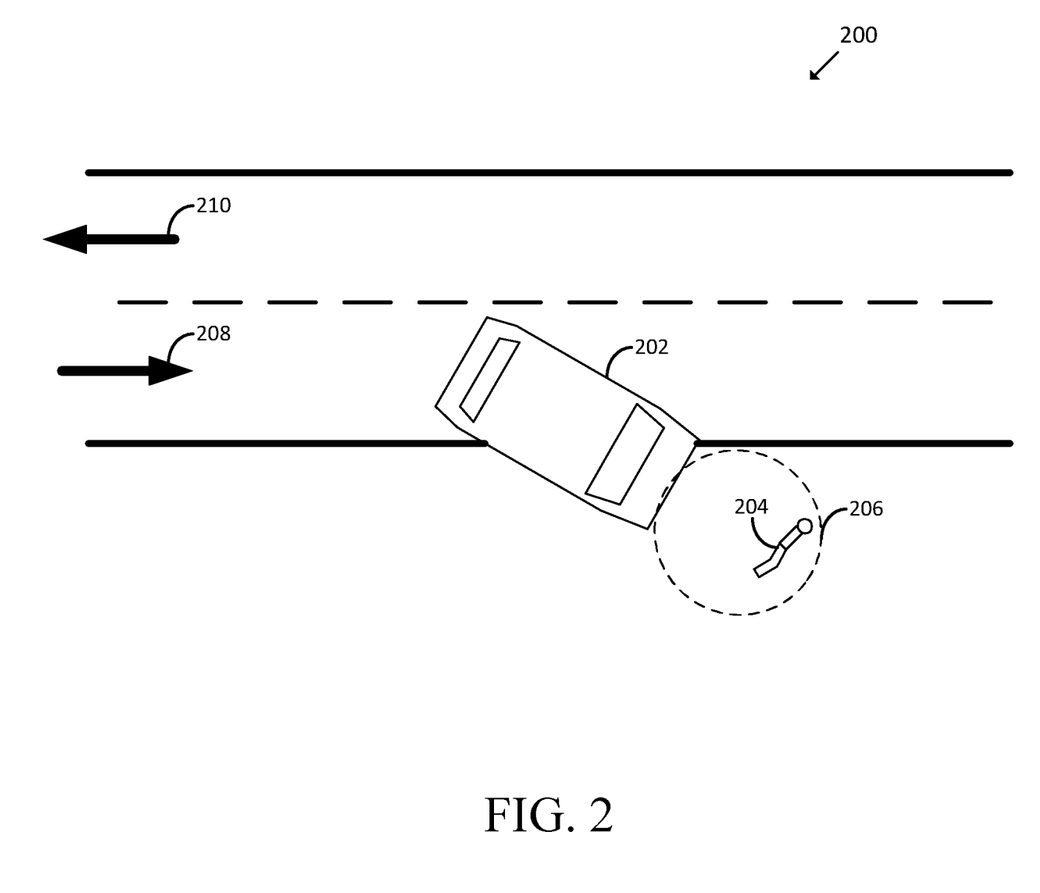
FIG. 2 depicts an example scenario involving a vehicular collision, in accordance with some embodiments.
Figure 3:
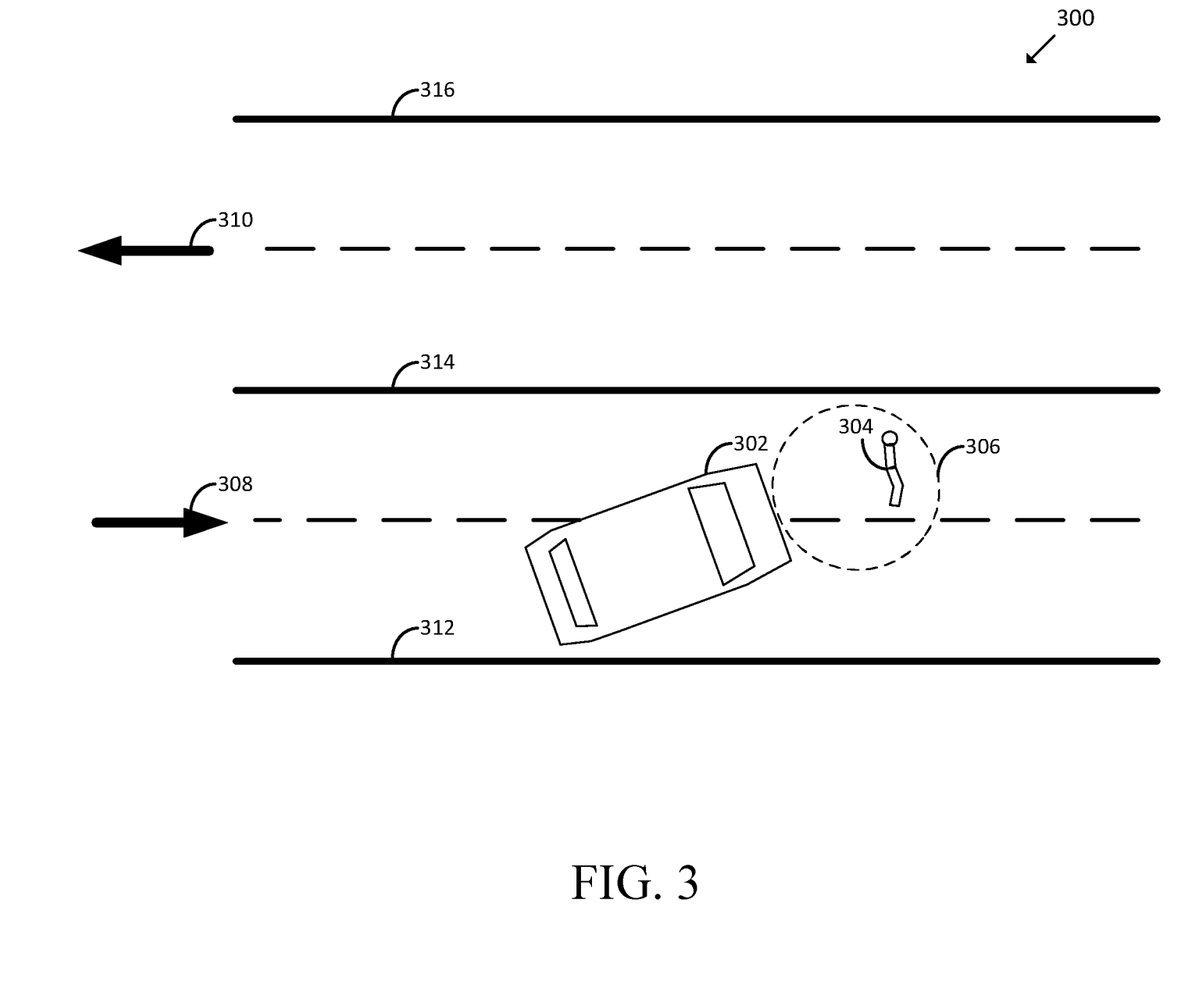
FIG. 3 depicts another example scenario involving a vehicular collision, in accordance with some embodiments.
Figure 4:
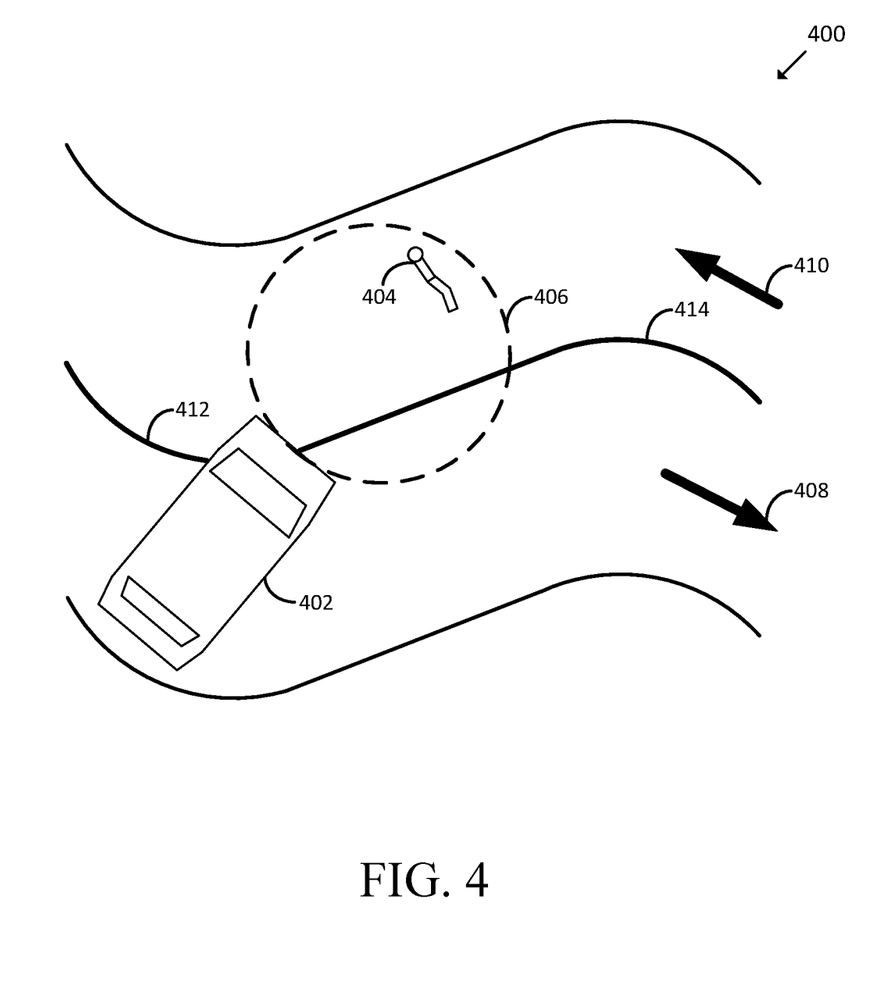
FIG. 4 depicts another example scenario involving a vehicular collision, in accordance with some embodiments.

FIGS. 2-4 illustrate example scenarios that include a vehicle and a person involved in a collision. Operation of system 100 from FIG. 1 will now be described in view of the example scenario depicted in FIG. 2. As shown in FIG. 2, route 200 includes vehicle 202 located in a lane along direction 208. Person 204 is located away from vehicle 202 and route 200 as a result of a vehicle collision resulting in an ejection from vehicle 202.

In this example scenario, the contact region unit 114 may receive (e.g., via network 108) the location of vehicle 202 and the location of person 204 (i.e., the location of a mobile device associated with person 204) and determine contact region 206. The contact region unit 114 may also retrieve information (e.g., number of lanes, speed limit, etc.) pertaining to route 200 from route database 112 based on the location of vehicle 202 and/or person 204. The contact region unit 114 may then be configured to perform an assessment according to the contact region 206 and the information pertaining to route 200. The assessment may include information that is used by the risk rating unit 116 to determine a traverse classification. For example, the assessment may include information indicative that the contact region 206 does not overlap a portion of route 200, the proximity of the contact region 206 to route 200, and an analysis of other aspects (e.g., one lane along direction 208, one lane along direction 210, etc.) of route 200 that pertain to the location of contact region 206.

Despite contact region 206 not overlapping a portion of route 200, the remote server 106 may use a set of rules relevant to determining a traverse classification based on at least the proximity of contact region 206 to route 200 and the number of lanes of route 200. Due to the number of lanes of route 200, the risk rating unit 116 may determine the same traverse classification (e.g., "Medium Risk") for vehicle operators approaching contact region 206 along direction 208 and direction 210. In one embodiment, the set of rules used to determine the traverse classification may account for a probability of additional vehicular collisions that may occur around contact region 206. For example, when vehicle operators traveling along direction 208 approach contact region 206, they may attempt to temporarily use the lane of travel along direction 210 in order to avoid vehicle 202. In this example, a vehicle operator approaching contact region 206 along direction 210 may be alarmed and react by applying the brakes suddenly upon detecting an oncoming vehicle (i.e., a vehicle operator avoiding vehicle 202) in the same lane. In one instance, a sudden braking event may not be detected by one or more subsequent vehicle operators travelling along direction 210 and thereby lead to an additional vehicle collision.

The navigation modification unit 118 may be configured to receive the traverse classification from the risk rating unit 116 and determine one or more options for rerouting around contact region 206. For example, the navigation modification unit 118 may determine that the last possible chance to reroute a vehicle operator traveling along direction 208 of route 200 may be at a distance of 1 mile away from contact region 206. For vehicle operators located at a predetermined distance (e.g., 1 mile) away from contact region 206, the navigation modification unit 118 may determine one or more options (e.g., various transportation routes) for rerouting around contact region 206. In this example, the remote server 106 may be configured to provide (e.g., transmit wirelessly) a notification that includes the traverse classification and the one or more options for rerouting. However, for vehicle operators that are within 1 mile of contact region 206, the remote server 106 may provide different options related to route guidance (e.g., reduce speed ahead, etc.) based on the lack of options for rerouting around contact region 206.

Referring to FIG. 3, operation of system 100 from FIG. 1 will now be described in view of another example scenario that depicts a vehicle and a person ejected from the vehicle. As shown in FIG. 3, route 300 includes vehicle 302 located in lanes along direction 308. Person 304 is located away from vehicle 302 within a lane of route 300 along direction 308. Route 300 also includes traffic barriers 312, 314, and 316.

In this example scenario, the remote server 106 may be configured to provide different traverse notifications to vehicle operators depending on a direction of travel along route 300. For example, the contact region unit 114 may receive the location of vehicle 302 and person 304 in order to determine contact region 306. The contact region unit 114 may retrieve route information from route database 112 that is specific to route 300. For instance, the route information may include specific information (e.g., stiffness, height, and type of barrier, etc.) about traffic barriers 312, 314, and 316 along route 300. Based on the contact region 306 and route information pertaining to route 300, the contact region unit 114 may perform an assessment and further provide the results of the assessment to risk rating unit 116.

The risk rating unit 116 may determine a traverse classification of "High Risk" for vehicle operators approaching contact region 306 along direction 308. In one example, the risk rating unit 116 may determine the "High Risk" due to contact region 306 overlapping both lanes of route 300 along direction 308 and an inability to avoid contact region 306 based on the presence of traffic barriers 312 and 314. In a similar manner, the risk rating unit 116 may determine a traverse classification of "Low Risk" for vehicle operators approaching collision 306 along direction 310. For example, the risk rating unit 116 may determine the "Low Risk" based on the contact region 306 not overlapping any lanes of route 300 along direction 310 and the function of traffic barrier 314 in preventing vehicles traveling along direction 308 from using lanes along direction 310 to avoid contact region 306.

Based on the traverse classification of "High Risk" for vehicle operators travelling along direction 308, the navigation modification unit 118 may determine that the best available option is a lane change along direction 308. Changing lanes may be recommended in order to allow for emergency responders to reach the contact region 306 in a more efficient manner. Although the vehicle operators traveling along direction 310 may be at a low risk, the remote server 106 may provide a notification that includes one or more ways of rerouting around contact region 306 in order to avoid traffic delays based on other vehicle operators slowing down to view contact region 306.

Referring to FIG. 4, operation of system 100 from FIG. 1 will now be described in view of another example scenario that depicts a vehicle and a person ejected from the vehicle. As shown in FIG. 4, route 400 includes vehicle 402 located in lanes along directions 408 and 410. Person 404 is located away from vehicle 402 within a lane of route 400 along direction 410.

In this example scenario, the remote server 106 may be configured to provide the same traverse notifications to vehicle operators traveling along either direction based on the location of the contact region 406 and the curvature of route 400 at one or more locations. For example, the contact region unit 114 may retrieve route information from route database 112 that includes the radius of curvature at locations 412 and 414 of route 400. In one example, the contact region unit 114 may refer to a set of rules that are specific to the geometric design of roads to perform the assessment. For instance, the set of rules may include safety thresholds corresponding to the distance of a contact region and the location on a route associated with a given degree of curvature. As shown in FIG. 4, the contact region unit 114 may perform an assessment that includes a determination of the relative location of contact region 406 to locations 412 and 414 of route 400. The assessment may also include a determination that the contact region 406 overlaps both lanes of route 400.

Based on the assessment, the risk rating unit 116 may determine a traverse classification of "High Risk" for vehicle operators approaching contact region 406 along directions 408 and 410. In one example, the risk rating unit 116 may determine the "High Risk" based on the proximity of contact region 406 to locations 412 and 414. In another example, the risk rating unit 116 may determine the "High Risk" based on the contact region 406 overlapping both lanes of route 400. The risk rating unit 116 may be configured to determine the traverse classification according to one or more ways of scoring/aggregating the results of the assessment performed by the contact region unit 114.

According to the "High Risk" determined by risk rating unit 116, the navigation modification unit 118 may determine one or more rest areas along route 400 that are accessible to vehicle operators travelling along direction 410. The remote server 106 may provide a notification to vehicle operators travelling along direction 410 that includes the determined traverse classification and directions to the rest area. Based on the example scenario in FIG. 4, the navigation modification unit 118 may also determine that there are no available options to avoid contact region 406 for vehicle operators travelling along direction 408. In this instance, the remote server 106 may provide a notification that includes the traverse classification and recommendation to reduce the speed of travel in order to prevent a sudden braking event as the vehicle operator approaches contact region 406.

Figure 5:
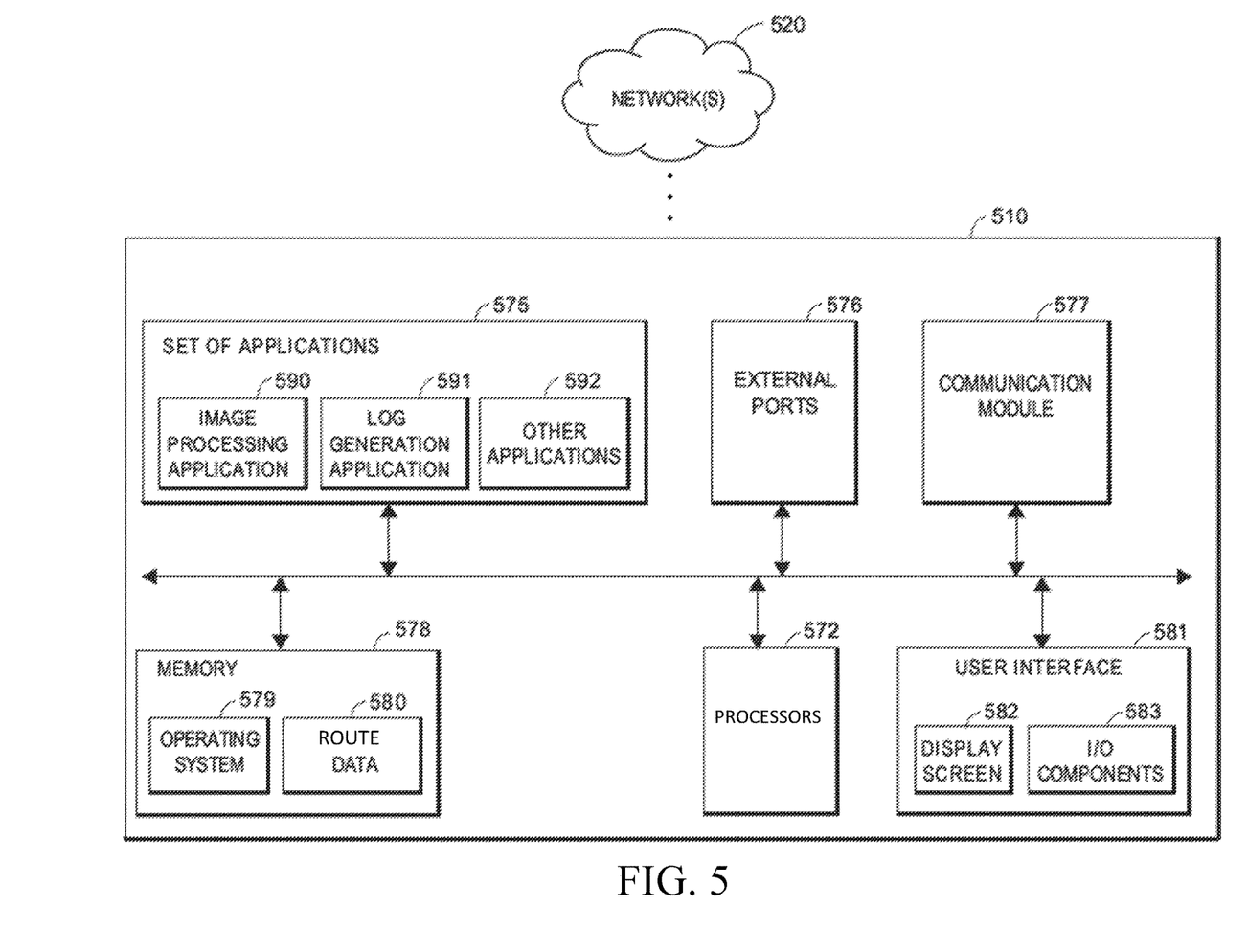
FIG. 5 is a block diagram of an exemplary system for providing a notification that includes a traverse classification, in accordance with some embodiments.

FIG. 5 illustrates a diagram of an exemplary system 510 (such as the system 100 of FIG. 1) in which the functionalities as discussed herein may be implemented. It should be appreciated that the system 510 may be configured to be transported in a vehicle and/or connect to an on-board telematics platform of the vehicle, as discussed herein. Further, it should be appreciated that the system 510 may be integrated into an on-board system of the vehicle.

The system 510 may include a processor 572 as well as a memory 578. The memory 578 may store an operating system 579 capable of facilitating the functionalities as discussed herein as well as a set of applications 575 (i.e., machine readable instructions). For example, one of the set of applications 575 may be an image processing application 590 configured to analyze image data of a road and determine the number of lanes affected by a contact region, and a log generation application 591 configured to record one or more traverse classifications associated with each direction of travel leading to the contact region. It should be appreciated that one or more other applications 592 are envisioned, such as an application configured to interface wirelessly with one or more electronic devices (e.g., a mobile device).

The processor 572 may interface with the memory 578 to execute the operating system 579 and the set of applications 575. According to some embodiments, the memory 578 may also include a library of route data 580. In some implementations, the image processing application 590 may interface with the route data 580 to retrieve information indicative of the geometric design of a given route and analyze one or more aspects of routes associated with the contact region and the contact region. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The system 510 may further include a communication module 577 configured to communicate data via one or more networks 520. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576. Further, the communication module 577 may include a short-range network component (e.g., an RFID reader) configured for short-range network communications. For example, the communication module 577 may receive, via the network 520, a library of route data from a remote server. For further example, the communication module 577 may transmit data to and receive data from a remote server via the network 520.

The system 510 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, speakers, microphones). According to some embodiments, the user may access the system 510 via the user interface 581 to review information and/or perform other functions. In some embodiments, the system 510 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor(s) 572 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, ActionScript, Objective-C, JavaScript, CSS, XML). In some embodiments, the computer program product may be part of a cloud network of resources.

Figure 6:
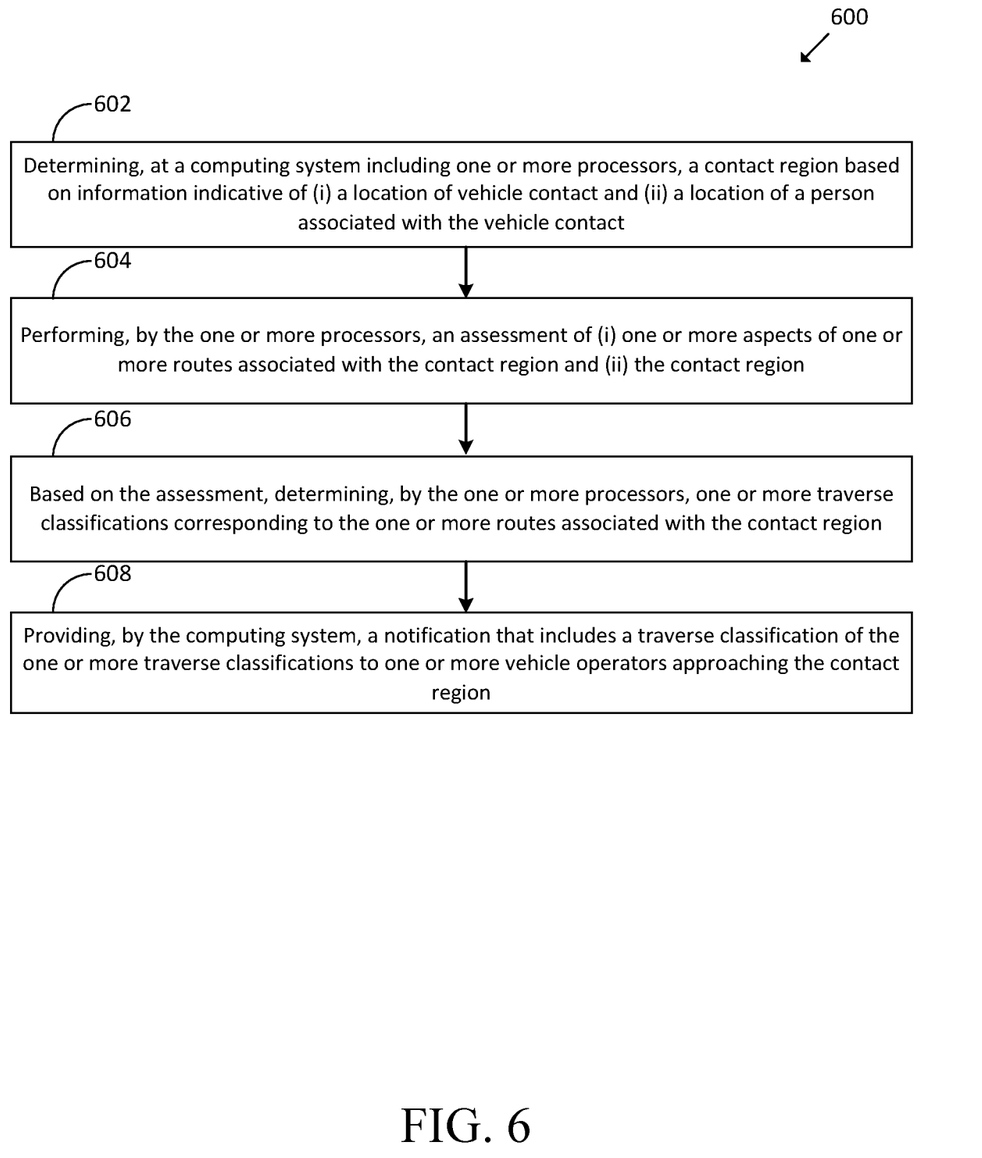
FIG. 6 depicts an example method for providing a notification that includes a traverse classification, according to an embodiment of the present disclosure.

FIG. 6 is a flow diagram of an example method for providing a notification that includes a traverse classification to one or more vehicle operators approaching a contact region, in accordance with at least some of the embodiments described herein. Although the blocks in each figure are illustrated in a sequential order, the blocks may in some instance be performed in parallel, and/or in a different order than those described therein. Also, the various blocks may be combined into fewer blocks, divided into additional blocks, and/or removed based upon the desired implementation.

In addition, the flow diagram of FIG. 6 shows the functionality and operation of one implementation of the present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer-readable media that stores data for short periods of time, such as register memory, processor cache, or Random Access Memory (RAM), and/or persistent long term storage, such as read only memory (ROM), optical or magnetic disks, or compact-disc read only memory (CD-ROM), for example. The computer readable media may also be, or include, any other volatile or non-volatile storage systems. The computer readable medium may be considered a computer readable storage medium, a tangible storage device, or other article of manufacture, for example.

Alternatively, each block in FIG. 6 may represent circuitry that is wired to perform the specific logical functions in the process. Illustrative methods, such as those shown in FIG. 6, may be carried out in whole or in part by a component or components in the cloud and/or system. However, it should be understood that example methods may instead be carried out by other entities or combinations of entities (i.e., by other computing devices and/or combinations of computing devices), without departing from the scope of the invention. For example, functions of the method of FIG. 6 may be fully performed by a computing device (or components of a computing device such as one or more processors), or may be distributed across multiple components of the computing device, across multiple computing devices, and/or across a server.

Referring to FIG. 6, the example method 600 may include one or more operations, functions, or actions as illustrated by blocks 602-608. In one embodiment, the method 600 is implemented in whole or in part by the system 100 of FIG. 1 (or one or more processors thereof), or the system 510 of FIG. 5.

The method 600 includes determining, at a computing system including one or more processors, a contact region based on information indicative of (i) a location of vehicle contact and/or (ii) a location of a person associated with the vehicle contact (block 602). In one embodiment, determining the contact region may include determining a geographic area that includes (i) a location of vehicle contact and (ii) a location of a person associated with the vehicle contact. In one example, the location (e.g., GPS data) of the vehicle contact may be transmitted by a vehicle communication system to a remote server upon detection of a collision event that includes ejection of one or more occupants based on data captured by one more sensors coupled to the vehicle. In this example, the location (e.g., GPS data) of the person may be transmitted by a mobile device (e.g., cellular telephone) associated with the person upon detection of a collision event that results in ejection from the vehicle. In another example, the mobile device may transmit the location data of the person to the vehicle which may in turn transmit the data to the remote server (e.g., remote server 106 of FIG. 1).

In some embodiments, the geographic area may also include a rollover zone. Based on the momentum of the person, the location of the person may be different from the location of the mobile device associated with the person. The rollover zone may be used to determine one or more possible areas where a person ejected from the vehicle may have landed.

The method 600 also includes performing, by the one or more processors, an assessment of (i) one or more aspects of one or more routes associated with the contact region, and/or (ii) the contact region (block 604). For example, the assessment may include performing an analysis of the determined geographic area pertaining to the contact region and one or more lanes of the one or more routes associated with the contact region. In this example, based on the analysis, the one or more processors may determine whether the contact region overlaps the one or more lanes. In some embodiments, the assessment may include the use of a set of rules that account for travel along the one or more routes. For example, the set of rules may specify how to include various aspects (e.g., curvature of the road, pitch of the road, etc.) of the road within the assessment. For instance, a route that contains one or more changes in elevation (e.g. a route through a mountain) may pose more of a risk to a vehicle operator approaching the contact region than a route with no changes in elevation (e.g., a route through a desert).

In some embodiments, the assessment may include other factors unrelated to the route such as weather conditions. For example, during a period of reduced visibility (e.g., rain, snow, etc.) associated with a route, it may be difficult for a vehicle operator to determine which lanes are affected by the contact region. In this example, the assessment may also include an analysis of the weather within a predetermined distance of the contact region.

The method 600 may also include based on the assessment, determining, by the one or more processors, one or more traverse classifications corresponding to the one or more routes associated with the contact region (block 606). In some embodiments, the one or more traverse classifications are associated with one or more levels of safety according to a given direction of travel leading to the contact region. For example, the traverse classification may be determined according to various results of an analysis included in the assessment such as the amount of overlap between the contact region and one or more lanes. In one example, the method may include assigning a traverse classification of increased risk to a direction of travel of a route based on the contact region overlapping one or more lanes. In some embodiments, one or more traverse classifications may be determined for each direction of travel leading to the contact region according to one or more distances to the contact region.

The method 600 may also include providing, by the computing system, a notification that includes a traverse classification of the one or more traverse classifications to one or more vehicle operators approaching the contact region (block 608). In one example, the computing system may use any suitable wireless communication protocol network, such as wireless telephony network (e.g., GSM, CDMA, LTE, etc.), a Wi-Fi network (802.11 standards), a WiMAX network, a Bluetooth network, a vehicle-to-vehicle communications network, etc. In one example, the notification may be stored in a central database that is accessible by one or more vehicle communication systems.

In some embodiments, the method 600 includes one or more additional blocks not shown in FIG. 6. For example, the method 600 may also include receiving, at the computing system, a heading of the one or more vehicle operators approaching the contact region. In this example, the method 600 may also include based on the heading, providing, by the computing system, a notification that includes a given traverse classification of one or more traverse classifications. Further, the notification may also include one more options for rerouting around the contact region.

For example, the remote server 106 of FIG. 1 may provide a vehicle operator approaching a contact region with a notification that includes a first option for rerouting around the contact region by maximizing the use of highways. In another embodiment, the remote server 106 may provide a second option that reroutes by maximizing the use of local roads instead. Both of the options may be possible at a certain distance (e.g., 5 miles away from the contact region) and therefore provided to vehicle operators with a given heading and located away from the contact region by at least the certain distance. In one example, the notification could be processed by an onboard vehicle system (e.g., a navigation unit) and displayed as options on a touchscreen display of the vehicle. In this example, the vehicle operator may then select an option via the touchscreen. In another example, the notification may be transmitted to a mobile device of the vehicle operator.

In some embodiments, the method 600 may also include receiving, at the computing system, information indicative of (i) a current location, and/or (ii) a travel destination associated with a given vehicle operator of the one or more vehicle operators approaching the contact region. In this example, the method 600 may also include determining, by the one or more processors, one or more directions for rerouting around the contact region based on (i) the current location, and/or (ii) the travel destination associated with the given vehicle operator. Further, the method 600 may also include providing, by the computing system, information indicative of the one or more directions to the given vehicle operator.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but also deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method comprising:
    determining, at a computing system including one or more processors, a geographic area including a location of vehicle contact and a location of a driver of the vehicle contact;
    determining, by the one or more processors, for each lane of one or more lanes of a route, whether the lane overlaps the geographic area;
    providing, by the computing system, a notification including one or more navigation instructions to respective mobile computing devices of one or more vehicle operators approaching the geographic area, the one or more navigation instructions based upon the determination of whether each lane of the one or more lanes overlaps the geographic area; and
    wherein the geographic area corresponds to a circular region having a diameter based on a distance between the location of vehicle contact and the location of the driver associated with the vehicle contact.

2. The computer-implemented method of claim 1, wherein determining whether each lane of the one or more lanes overlaps the geographic area comprises determining that a shoulder of the route overlaps the geographic area, and wherein the providing the notification including the navigation instruction includes providing an instruction to avoid a particular one of the one or more lanes that is adjacent to the shoulder of the route.

3. The computer-implemented method of claim 1, wherein determining whether each lane of the one or more lanes overlaps the geographic area comprises determining that every lane of the route overlaps the geographic area, and wherein providing the notification including the one or more navigation instructions comprises providing an instruction to avoid the route.

4. The computer-implemented method of claim 3, wherein providing the instruction to avoid the route comprises providing an indication of one or more alternate routes not overlapping the geographic area.

5. The computer-implemented method of claim 1, wherein the route comprises two or more lanes, wherein determining whether each lane overlaps the geographic comprises determining a first portion of the two or more lanes that overlap the geographic area and a second portion of the two or more lanes that do not overlap the geographic area, and wherein providing the notification including the one or more navigation instructions comprises providing an instruction to utilize the second portion the two or more lanes and to avoid the first portion of the two or more lanes.

6. The computer-implemented method of claim 1, wherein the providing of the one or more navigation instructions is further based upon a current weather condition associated with the route near the geographic area.

7. The computer-implemented method of claim 1, wherein the providing of the one or more navigation instructions is further based upon an elevation or include associated with the route near the geographic area.

8. The computer-implemented method of claim 1, wherein determining the geographic area includes determining a trajectory of the driver associated with ejection from the vehicle.

9. A computing system comprising:
    one or more processors; and
    a non-transitory computer-readable memory coupled to the one or more computing devices and storing thereon computer-executable instructions that, when executed via the one or more processors, cause the computing system to:

determine a geographic area including a location of vehicle contact and a location of a driver of the vehicle contact;

determine, for each lane of one or more lanes of a route, whether the lane overlaps the geographic area;

provide, to respective mobile computing devices of one or more vehicle operators approaching the geographic area, a notification including one or more navigation instructions, the one or more navigation instructions based upon the determination of whether each lane of the one or more lanes overlaps the geographic area;

wherein the geographic area corresponds to a circular region having a diameter based on a distance between the location of vehicle contact and the location of the driver associated with the vehicle contact.

10. The computing system of claim 9, wherein determining whether each lane of the one or more lanes overlaps the geographic area comprises determining that a shoulder of the route overlaps the geographic area, and wherein the providing the notification including the navigation instruction includes providing an instruction to avoid a particular one of the one or more lanes that is adjacent to the shoulder of the route.

11. The computing system of claim 9, wherein determining whether each lane of the one or more lanes overlaps the geographic area comprises determining that every lane of the route overlaps the geographic area, and wherein providing the notification including the one or more navigation instructions comprises providing an instruction to avoid the route.

12. The computing system of claim 11, wherein providing the instruction to avoid the route comprises providing an indication of one or more alternate routes not overlapping the geographic area.

13. The computing system of claim 9, wherein the route comprises two or more lanes, wherein determining whether each lane overlaps the geographic comprises determining a first portion of the two or more lanes that overlap the geographic area and a second portion of the two or more lanes that do not overlap the geographic area, and wherein providing the notification including the one or more navigation instructions comprises providing an instruction to utilize the second portion the two or more lanes and to avoid the first portion of the two or more lanes.

14. The computing system of claim 9, wherein the providing of the one or more navigation instructions is further based upon a current weather condition associated with the route near the geographic area.

15. The computing system of claim 9, wherein the providing of the one or more navigation instructions is further based upon an elevation or include associated with the route near the geographic area.

16. The computing system of claim 9, wherein determining the geographic area includes determining a trajectory of the driver associated with ejection from the vehicle.

17. One or more non-transitory, computer-readable media storing computer-executable instructions that, when executed via one or more processors, cause a computer to:

determine a geographic area including a location of vehicle contact and a location of a driver of the vehicle contact;

determine, for each lane of one or more lanes of a route, whether the lane overlaps the geographic area;

provide, to respective mobile computing devices of one or more vehicle operators approaching the geographic area, a notification including one or more navigation instructions, the one or more navigation instructions based upon the determination of whether each lane of the one or more lanes overlaps the geographic area;

wherein the geographic area corresponds to a circular region having a diameter based on a distance between the location of vehicle contact and the location of the driver associated with the vehicle contact.

18. The one or more non-transitory computer-readable media of claim 17, wherein the route comprises two or more lanes, wherein determining whether each lane overlaps the geographic comprises determining a first portion of the two or more lanes that overlap the geographic area and a second portion of the two or more lanes that do not overlap the geographic area, and wherein providing the notification including the one or more navigation instructions comprises providing an instruction to utilize the second portion the two or more lanes and to avoid the first portion of the two or more lanes.

* * * * *